T. SHIMADZU.
FUNNEL.
APPLICATION FILED SEPT 28, 1920.
1,378,729. Patented May 17, 1921.
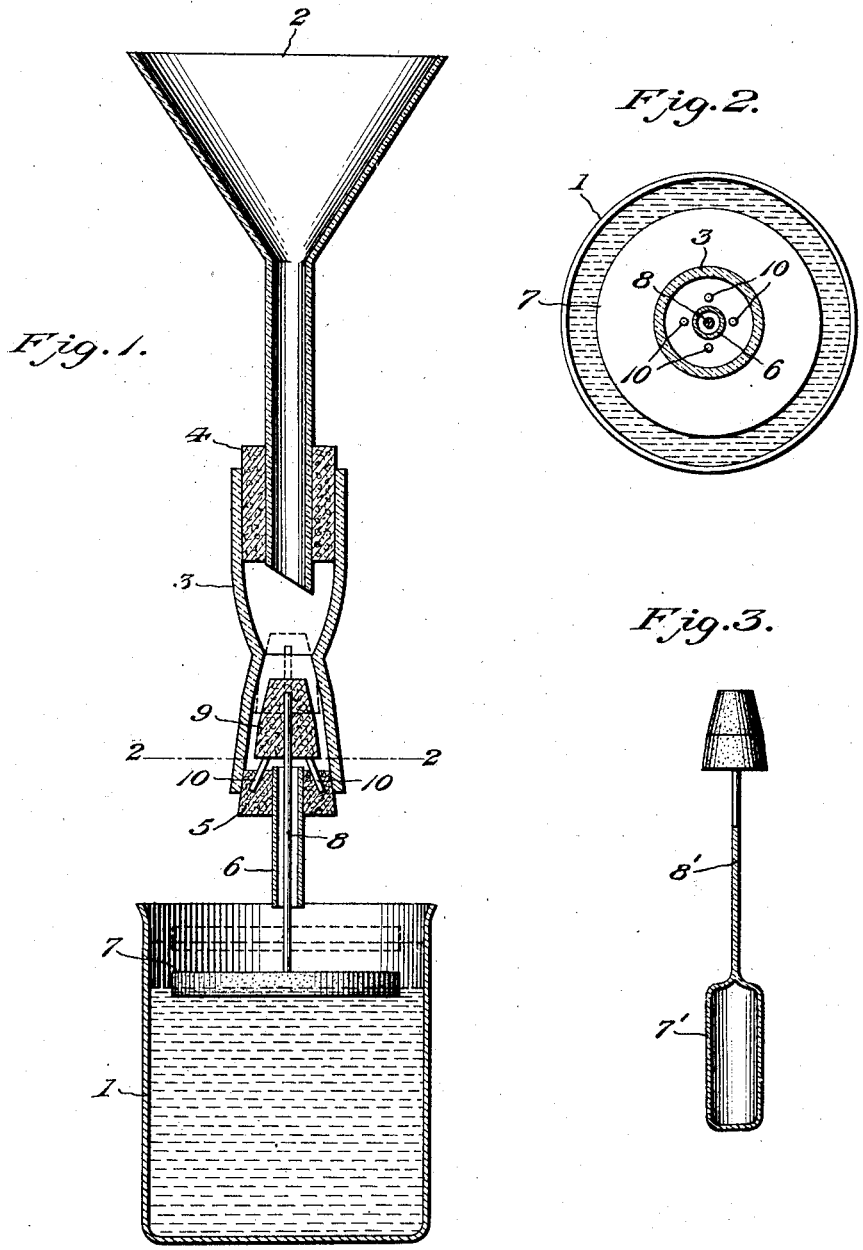
Tadamitsu Shimadzu INVENTOR

UNITED STATES PATENT OFFICE.

TADAMITSU SHIMADZU, OF TOKYO, JAPAN.

FUNNEL.

1,378,729.

Specification of Letters Patent.   Patented May 17, 1921.

Application filed September 28, 1920. Serial No. 413,450.

*To all whom it may concern:*

Be it known that I, TADAMITSU SHIMADZU, a subject of the Emperor of Japan, residing at Tokyo, Japan, have invented new and useful Improvements in Funnels, of which the following is a specification.

This invention relates to a receptacle filling means, the principal object of the invention being to provide means for automatically stopping the flow of liquid when the level of the liquid in the receptacle reaches a certain point.

Another object of the invention is to provide means whereby all the parts may be easily separated for the purpose of cleaning the same or repairing the same.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a sectional view showing one form of the invention.

Fig. 2 is a section on line 2—2 of Fig. 1.

Fig. 3 is a view of a modification.

In these views 1 indicates the receptacle to be filled and 2 indicates the funnel through which the liquid passes on its way to the receptacle, said funnel being suitably supported above the receptacle. A member 3 of hour glass shape has its upper end closed by a stopper 4 through which the lower end of the funnel passes. The lower end of member 3 is closed by a stopper 5 and a tube 6 passes through said stopper, the lower end of this tube being located adjacent the open end of the receptacle so as to direct the fluid passing from the funnel and through the member 3 into the receptacle. A float 7 is located in the receptacle and the rod 8 of said float passes through tube 6 into member 3 where it is connected with a valve member 9, said member being adapted to engage the contracted part of the member and close the same and thus prevent the passage of liquid through said member. The member 9 is held above the upper end of the tube by pins 10 projecting from the upper face of the stopper 5.

It will thus be seen that when the level of liquid in the receptacle is low the valve member 9 will rest upon the pins 10 so that the liquid passing through the funnel can flow through the constricted part of the member 3, around valve member 9 and through the tube 6 into the receptacle. As soon as the level of liquid in receptacle 1 rises, however, the float will be carried upwardly and its rod will force valve member 9 into the constricted part of member 3, thus closing the same and preventing the flow of liquid therethrough The level of the liquid in receptacle 1 can be regulated by separating more or less the member 3 and receptacle 1.

In the modification shown in Fig. 3 I make the float 7' and its rod 8' of glass, the float being hollow. By this construction the device may be used for filling bottles and other receptacles having a small top.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a receptacle, an hourglass shaped member having an upper and a lower end, stoppers closing said ends, a tube passing through the lower end and located adjacent the open end of said receptacle, a float arranged in said receptacle, a valve member arranged in the lower part of said hourglass shaped member and means connecting said float to the valve member.

2. A device of the class described comprising a receptacle, an hourglass shaped member having an upper and a lower end, stoppers closing said ends, a tube passing through the lower end and located adjacent the open end of said receptacle, a float arranged in said receptacle, a valve member arranged in the lower part of said hourglass shaped member, means connecting said float to the valve member, a funnel mounted in the upper end of said hour shaped member and passing through said stopper.

In testimony whereof I affix my signature.

TADAMITSU SHIMADZU.

Witnesses:
 GENJI KURIBARA,
 S. KATAKERSA.